United States Patent
Loreggia et al.

(10) Patent No.: US 9,547,821 B1
(45) Date of Patent: Jan. 17, 2017

(54) DEEP LEARNING FOR ALGORITHM PORTFOLIOS

(71) Applicant: International Business Machines Corporation, Armonk, NY (US)

(72) Inventors: Andrea Loreggia, Padua (IT); Yuri Malitsky, New York, NY (US); Horst C. Samulowitz, White Plains, NY (US); Vijay A. Saraswat, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/015,272

(22) Filed: Feb. 4, 2016

(51) Int. Cl.
  *G06N 3/08* (2006.01)
  *G06N 99/00* (2010.01)
  *G06N 3/02* (2006.01)

(52) U.S. Cl.
  CPC .............. *G06N 3/08* (2013.01); *G06N 99/005* (2013.01); *G06N 3/02* (2013.01)

(58) Field of Classification Search
  CPC ........... G06N 3/08; G06N 99/005; G06N 3/02
  See application file for complete search history.

(56) References Cited

U.S. PATENT DOCUMENTS

| | | | | |
|---|---|---|---|---|
| 2008/0159589 A1* | 7/2008 | Benyoub | ................... | G06K 9/38 382/101 |
| 2011/0131163 A1* | 6/2011 | Stern | ........................ | G06N 5/04 706/13 |
| 2015/0063688 A1* | 3/2015 | Bhardwaj | ................ | G06K 9/18 382/159 |

OTHER PUBLICATIONS

Deep Learning for Algorithm Portfolios, by Loreggia, published 2015.*
Convolutional Neural Network Committees for Handwritten Character Classification, by Ciresan, published 2011.*
Hoshen, et al., "Visual Learning of Arithmetic Operations", arXiv:1506.02264, Last revised Nov. 27, 2015, to appear in: AAAI Conference on Artificial Intelligence (AAAI 16'), Phoenix Arizona, Feb. 2016, 8 pages.
Vinyals, et al., "Show and Tell: A Neural Image Caption Generator" 2015 IEEE Conference on Computer Vision and Pattern Recognition (CVPR), Jun. 7-12, 2015, Boston, MA, pp. 3156-3164.
Xu, et al., "SATzilla: Portfolio-based Algorithm Selection for SAT" Journal of Artificial Intelligence Research, vol. 32, Jun. 2008, pp. 565-606.

* cited by examiner

*Primary Examiner* — Stanley K Hill
*Assistant Examiner* — Thomas Fink
(74) *Attorney, Agent, or Firm* — Scully, Scott, Murphy & Presser, P.C.; Kevin Jordan

(57) ABSTRACT

Automated feature construction for algorithm portfolios in machine learning is provided. A gray scale image is generated from a text representing a problem instance. The gray scale image is rescaled or reshaped to a predefined size that is smaller than an initial size of the gray scale image. The rescaled gray scale image represents features of the problem instance. The rescaled gray scale image is input as features to a machine learning-based convolutional neural network. Based on the rescaled gray scale image, the machine learning-based convolutional neural network is automatically trained to learn to automatically determine one or more problem solvers from a portfolio of problem solvers suited for solving the problem instance.

20 Claims, 11 Drawing Sheets

DEEP LEARNING FOR ALGORITHM PORTFOLIOS

FIELD

The present application relates generally to computers and computer applications, and more particularly to computer-implemented machine learning and automated feature construction for algorithm portfolios using computer-implemented deep learning.

BACKGROUND

In many scenarios there is no single solver that will dominate or provide optimal performance across a wide range of problem instances. Algorithm selection in algorithm portfolios is designed to help identify the best approach for each problem at hand, to select the best algorithm for a given problem instance. This selection is usually based on carefully constructed features that characterize problem instances, designed to quickly present the overall structure of the problem instance as a constant size numeric vector. Based on these features, a number of machine learning techniques can be utilized to predict the appropriate solver to execute, leading to improvements over relying solely on any one solver. However, feature generation usually involves a manually process, and the creation of good features becomes an arduous task requiring a great deal of knowledge of the problem domain of interest and expertise.

BRIEF SUMMARY

A computer-implemented method and system that automates feature construction for algorithm portfolios in machine learning may be provided. The method, in one aspect, may include receiving a problem instance represented as text describing a problem to be solved by computer-implemented problem solver. The method may also include generating a gray scale image from the text by converting the text into the gray scale image that corresponds to the text. The method may also include rescaling the gray scale image to a predefined size that is smaller than an initial size of the gray scale image, into a rescaled gray scale image, the rescaled gray scale image representing features of the problem instance. The method may also include inputting the rescaled gray scale image as features to a machine learning-based convolutional neural network. The method may also include training based on the rescaled gray scale image, by one or more of the processors, the machine learning-based convolutional neural network to learn to automatically determine one or more problem solvers from a portfolio of problem solvers suited for solving the problem instance. The receiving, generating, rescaling and inputting may be performed for a plurality of problem instances for the training.

A system of automated feature construction for algorithm portfolios in machine learning, in one aspect, may include one or more memory devices and one or more hardware processors operatively coupled to the memory device. One or more of the hardware processors may be operable to receive a problem instance represented as text describing a problem to be solved by computer-implemented problem solver. One or more of the hardware processors may be further operable to generate a gray scale image from the text by converting the text into the gray scale image that corresponds to the text. One or more of the hardware processors may be further operable to rescale the gray scale image to a predefined size that is smaller than an initial size of the gray scale image, into a rescaled gray scale image, the rescaled gray scale image representing features of the problem instance. One or more of the hardware processors may be further operable to train based on the rescaled gray scale image as features, a machine learning-based convolutional neural network to learn to automatically determine one or more problem solvers from a portfolio of problem solvers suited for solving the problem instance. One or more of the hardware processors may be operable to receive multiple problem instances, generate multiple gray scale images and rescale to multiple rescaled gray scale images respectively, the multiple rescaled gray scale images used as a training dataset for training the machine learning-based convolutional neural network.

A computer readable storage medium or device storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
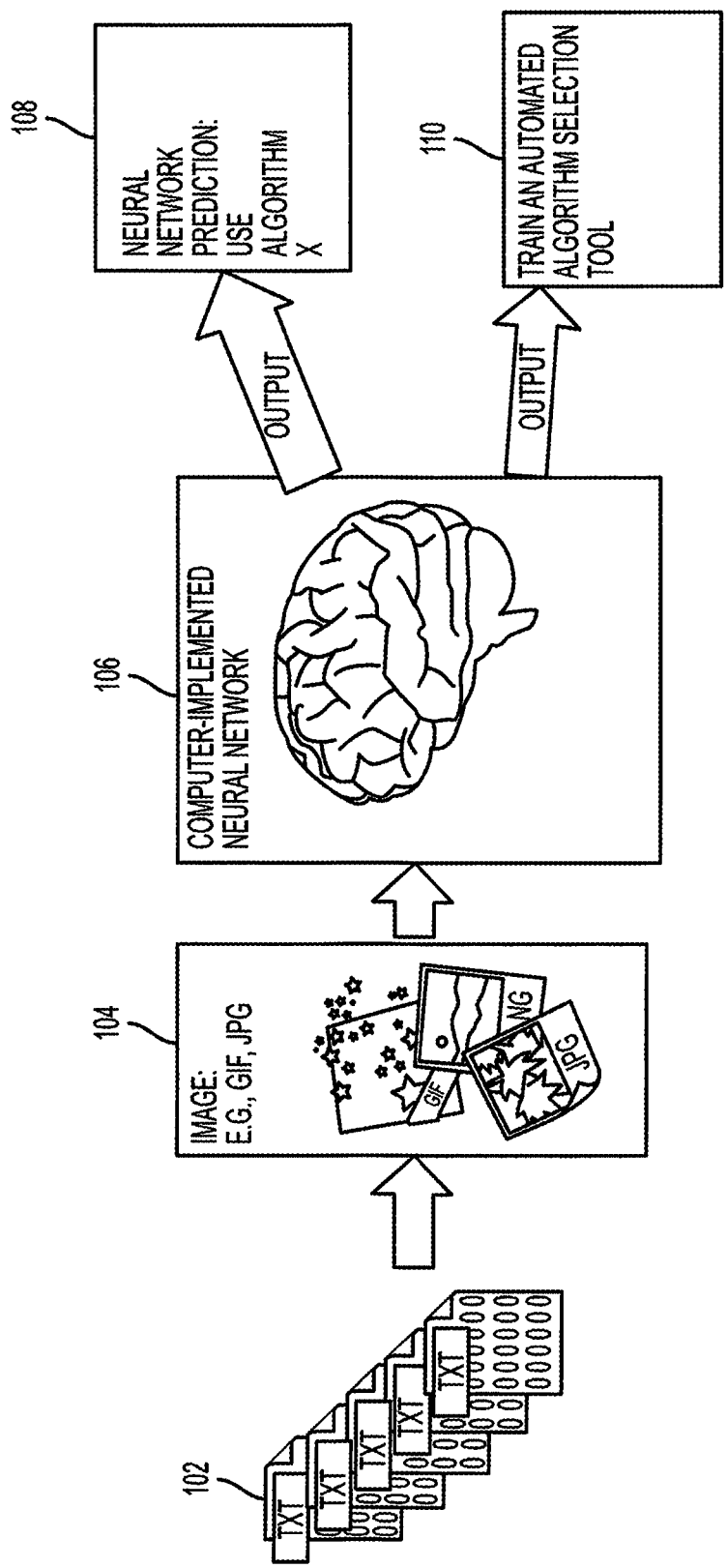
FIG. 1 is a diagram illustrating an overview of a methodology of the present disclosure in one embodiment.

A system, method and/or technique are disclosed for an automated methodology for producing an informative set of features utilizing a deep neural network. In one embodiment, the methodology completely automates an algorithm selection pipeline, achieving significantly better performance than using a single best solver across multiple problem domains.

A solver refers to a computer-implemented algorithm that solves a problem, for example, in a variety of domains. Rather than being general purpose programs, solvers may be specialized for a small subset of problems. Given the number of specialized solvers (a portfolio of solvers), algorithm selection techniques identify or determine which of the solvers should be used for a given problem instance. Such algorithm selection techniques rely on the quality of a set of structural features they use to distinguish among the problem instances. If the features are too noisy or uninformative, a selection technique may be unable to make intelligent decisions.

A computer-implemented autonomous and automatic approach to the feature generation process in one embodiment of the present disclosure may employ a deep learning approach, providing a new training approach. In many domains, the specifics of any problem instance are expressed as a text document. For example, a Satisfiability (SAT) problem is typically represented in the DIMACS conjunctive normal form (CNF) format where after a header, each line in the file describes the literals in each clause. Briefly, in computer science, the Boolean Satisfiability Problem (also referred to as Propositional Satisfiability Problem, Satisfiability or SAT) is the problem of determining if there exists an interpretation that satisfies a given Boolean formula, for example, whether a proposition statement evaluate to true. Similarly, Constraint satisfaction problem (CSP) can be represented in the XCSP format (extended markup language (XML) representation of constraint networks) while mixed integer programs (MIPs) can be represented in linear programming (LP) or Mathematical Programming System (MPS) formats.

Regardless of the format, the problem instances are represented in a text file. A methodology of the present disclosure in one embodiment may automatically convert any such text file into an image, e.g., a grayscale square image, which can in turn be used to train a deep neural network to predict the best solver for the instance. In one embodiment, little information may be used to predict which solver or algorithm to use, for example, by shooting a photo (creating an image) of the problem instance and using the information in the image to predict the best solver. The approach in one embodiment of the present disclosure works across multiple problem representations, each of which may have a unique grammar and internal organization of data, and may vary in terms of their size. While most machine learning approaches rely on constant sized feature vectors, the approach of the present disclosure in one embodiment may work across multiple problem representations with varying sizes. A methodology of the present disclosure in one embodiment represents a diverse class of problem domains in a finite representation.

Algorithm selection is the study of choosing the most appropriate solver for the problem at hand based on a descriptive set of features that describe the instance. In one embodiment of the present disclosure, a technique such as the cost-sensitive hierarchical clustering (CSHC) is used to build an algorithm portfolio based on features that characterize the problem instances. CSHC bases its decision by training a forest of random trees. Each tree in the forest is trained with a splitting criterion that ensures that it divides the training data such that the instances in each child node, maximally agree on the solver they prefer. The partitioning stops when the amount of data in a child node becomes too small. To ensure variation of the forest, each tree is trained on a random subset of 70% of the data and a random subset of considered features. Therefore, whenever a new instance is presented, each tree votes for the best solver based on its data.

FIG. 1 is a diagram illustrating an overview of a methodology of the present disclosure in one embodiment. Problem instances may be represented as text 102. Such text representations of problem instances may be received, for example, by one or more hardware processors. A problem instance represented as text describes a problem to be solved by a computer-implemented problem solver. The text is converted to images 104. For example, one or more of the processors generates a gray scale image from the text by converting the text into the gray scale image that corresponds to the text. The gray scale image is rescaled, for example, by one or more of the processors, to a predefined size that is smaller than the gray scale image size into a rescaled gray scale image. The rescaled gray scale image represents features of the problem instance. In this way, automatic feature extraction may be performed by a machine. The rescaled gray scale image is input as features to a machine learning-based convolutional neural network 106. The machine learning-based convolutional neural network is trained based on the rescaled gray scale image to learn to automatically determine one or more problem solvers from a portfolio of problem solvers suited for solving the problem instance. As shown at 102, multiple text representations corresponding to multiple problem instances may be received. Each of the multiple text representations may be generated into a corresponding image and rescaled. The rescaled gray scale image captures structure of the underlying problem instance.

Each of the rescaled images may be input to train the neural network 106. For instance, the neural network may be trained using the images corresponding to the problem instances. In one embodiment, the neural network 106 is trained to output a prediction of which algorithm to use for a given problem instance, for example, as shown at 108.

The machine learning-based convolutional neural network that is trained may be executed to select the problem solver suited to solving a new problem instance (also referred to as a test instance). The trained neural network may be used, e.g., run or executed on a hardware processor, to predict a solver for a new problem instance. The neural network may output for each solver a value between 0 and 1, where 0 indicates that the solver cannot solve the problem instance and 1 means that the solver can solve the problem instance. For example, the trained neural network may be used to predict which solver could finish a given problem instance within a given time limit or timeframe. The neural network may output for each solver a value between 0 and 1, where 0 indicates that the solver cannot finish the given problem instance and 1 means that the solver can finish the given problem instance. The neural network may select the solver whose output obtains the highest value.

The output layer (or other layers) of the neural network 106 may be also used to train an automated algorithm selection tool as shown at 110. For example, the output layer of the neural network may be used or interpreted as a new feature vector for another algorithm selection method or tool. The output layer of a neural network corresponds to a set of values that are mapped to a prediction of the neural network. The methodology of the present disclosure in one embodiment may use the values of the output layer that the prediction is based on as a feature vector. An algorithm selection can then be trained based on those feature vectors and make decision what algorithm to use.

The text files 102 may have different specifications. There may many file specifications utilized, each one specifically formulated to most conveniently represent a particular problem. For example, Satisfiability instances are typically represented in CNF format:

c SAT EXAMPLE
p cnf 3 2
1 −3 0
2 3 −1 0

In this representation a line beginning with a "c" is considered a comment, while "p" signals the problem type, number of variables and number of clauses. The subsequent lines list the literals belonging to each clause, with a minus sign depicting a negation. In the example above, the mathematical SAT problem represented is: $(x_1 \vee \neg x_3) \wedge (x_2 \vee x_3 \vee \neg x_1)$.

The CNF format efficiently captures all the necessary details about the SAT problem, but at the same time is unable to capture the requirements of a full constraint satisfaction problem. The XCSP format may be a better fit, which uses XML to first specify the domains, then the variables, and then the relations between the variables. The example below defines a problem with variables A1 and A2 that can take a value 1 or 2, each of which is different.

<domains nbDomains="1">
<domain name="d0" nbValues="2">1 . . . 2</domain>
</domains>
<variables nbVariables="2">
   <variable name="A1" domain="d0"/>
   <variable name="A2" domain="d0"/>
</variables>
<constraint name="c0" arity="2"
   scope="A1 A2"
   reference="global:alldifferent"/>

The SAT problem could be represented as a CSP. Also, any nondeterministic polynomial time (NP)-complete problem may be encoded into any other NP-complete problem in polynomial time. The methodology of the present disclosure is able to take potentially any problem definition and encode into a usable entity or item by a machine learning approach like a deep neural network. The methodology of the present disclosure in one embodiment takes the above-presented or any other formats and converts them to grayscale images with a predefined dimension n. The methodology of the present disclosure may also use these images to train and test a deep neural network. In one embodiment, the deep neural network may be tested using 10-fold-cross validation. In one embodiment, the output 108 of the network represents a scoring of all solvers on the provided input instances. In one embodiment, the output may be used directly as a selection approach. In another embodiment, the output may be used as new features to be used by existing selection strategies, e.g., as shown at 110.

Figure 2:
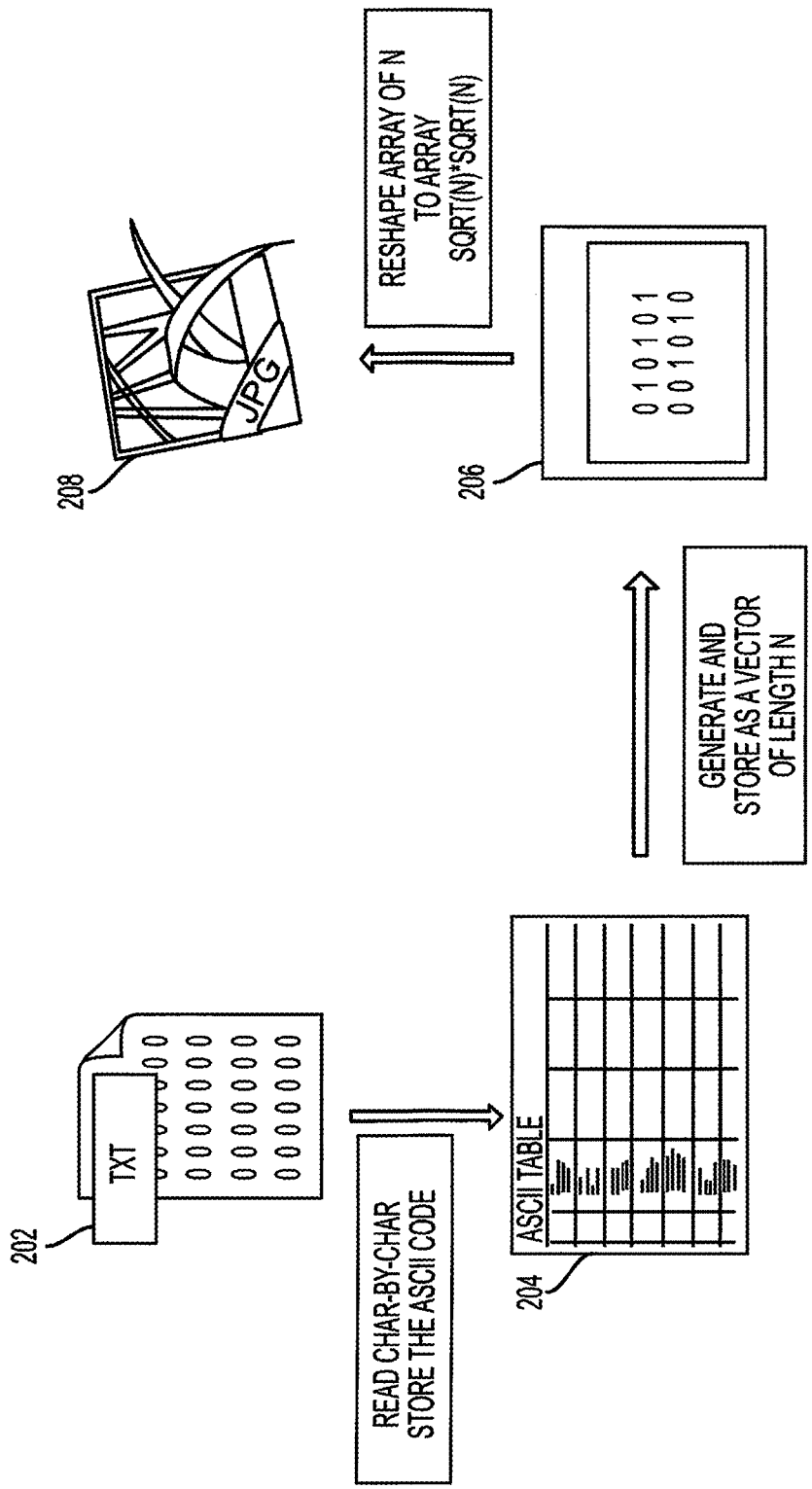
FIG. 2 is a diagram illustrating an overview of converting text representation of a problem instance to an image representing features for machine learning in one embodiment of the present disclosure.

FIG. 2 is a diagram illustrating an overview of converting text representation of a problem instance to an image representing features for machine learning in one embodiment of the present disclosure. The conversion methodology of the present disclosure in one embodiment works with input documents and output images of different sizes. For example, the vocabulary and grammar is vastly different between the CNF and XCSP formats. Hence, for example, the methodology of the present disclosure in one embodiment works without employing known structures, and works generally for all formats. In one embodiment, the typical approach of counting the frequency of words is not considered in the methodology of the present disclosure. The methodology of the present disclosure in one embodiment may consider the relations of which words they appear next to. Problems can be of widely different sizes, for example, with SAT instances ranging from hundreds to millions of clauses and CSP instance including just dozens of lines. The methodology of the present disclosure in one embodiment provides a way to represent those different formats.

The conversion process in one embodiment may work as follows. The process in one embodiment is performed automatically by one or more hardware processors. For a problem instance represented in text 202, the plain text file is read character by character and replaced with its corresponding ASCII code 204, for example, retrieved from ASCII table stored in a memory device or the like. Each such code is stored in a vector 206 of length N, where N is the number of total characters in the input file. The vector 206 may be stored on a memory device and/or storage device. After reading the entire file, the vector is reshaped using the new dimension $\sqrt{N}$. For instance, if the vector 206 is of length 9 then the resulting in the two dimensional vector of size 3×3. The methodology may draw a square gray scale image 208 for each problem instance 202 using the ASCII code value 204 for a shade of gray.

For example, the following snippet of a CNF file:
88 1134 1972 0
699 81 −1082 0
−239 −1863 1594 0
is represented as the following vector of ASCII codes:
[56,56,32,49,49,51,52,32,49,57,55, . . . ].

In one embodiment, all characters are mapped—including spaces and line break symbols. ASCII codes range between 0 and 255 and they can be mapped to gray scale. In one embodiment, there exists a one-to-one mapping from the original text to the image and vice versa, and therefore, the initial image representation is loss-free. The methodology of the present disclosure in one embodiment rescales the image (the initial image) to a predefined size, for example, using standard image scaling operators. An example of a predefined size may be, 128×128 pixel size. Another example of a predefined size may be 32×32. Yet another example may be 256×256. In one embodiment, the conversion process of the present disclosure produces a set of images which are all of the same size. Instances expose structure and self-similarity (patterns can be visualized using images) and these properties can be maintained once the images are rescaled. The images can be useful to visualize and to analyze these structures, regardless of the considered domain (or the problem instance). Images may be large, for example, 300 megabytes (MB). Reshaping reduces images to smaller dimensions, e.g., 16 kilobytes (KB). Maintaining the appearance maintains the needed structure. While scaling the images incurs a loss in information, the retained structure is sufficient to address decision problems such as algorithm selection.

Figure 3A:
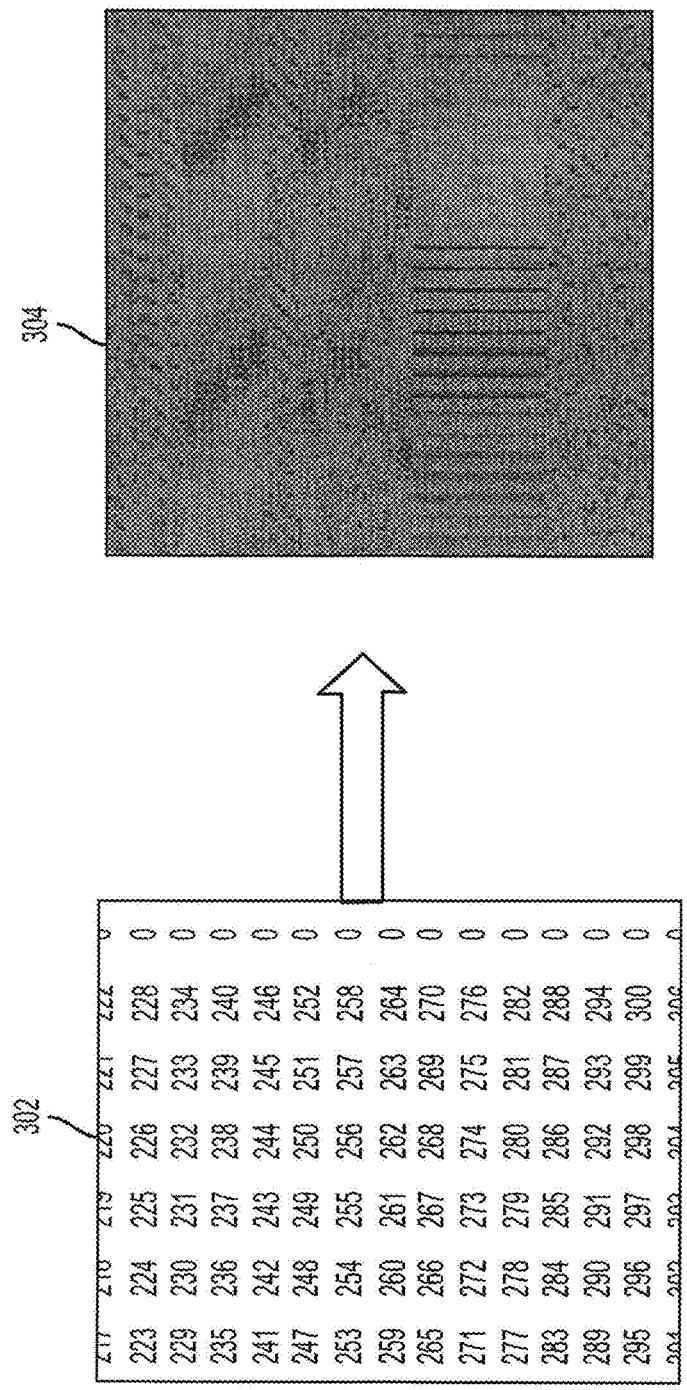
FIGS. 3A, 3B, 3C, 3D and 3E show example problem instances converted to images.
Figure 3B:
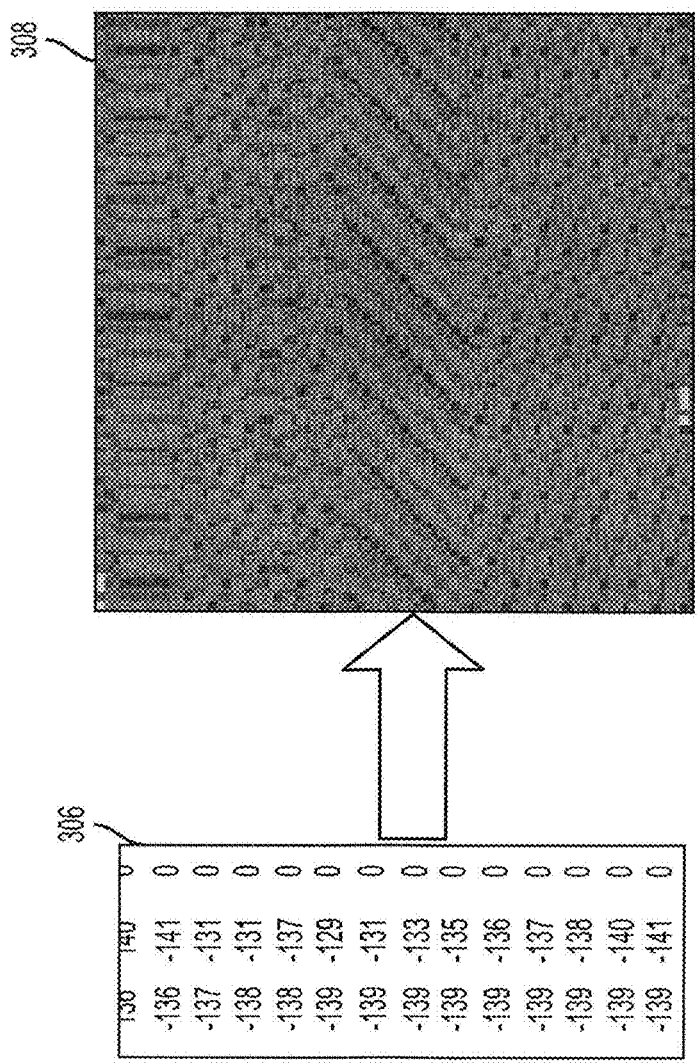
Figure 3C:
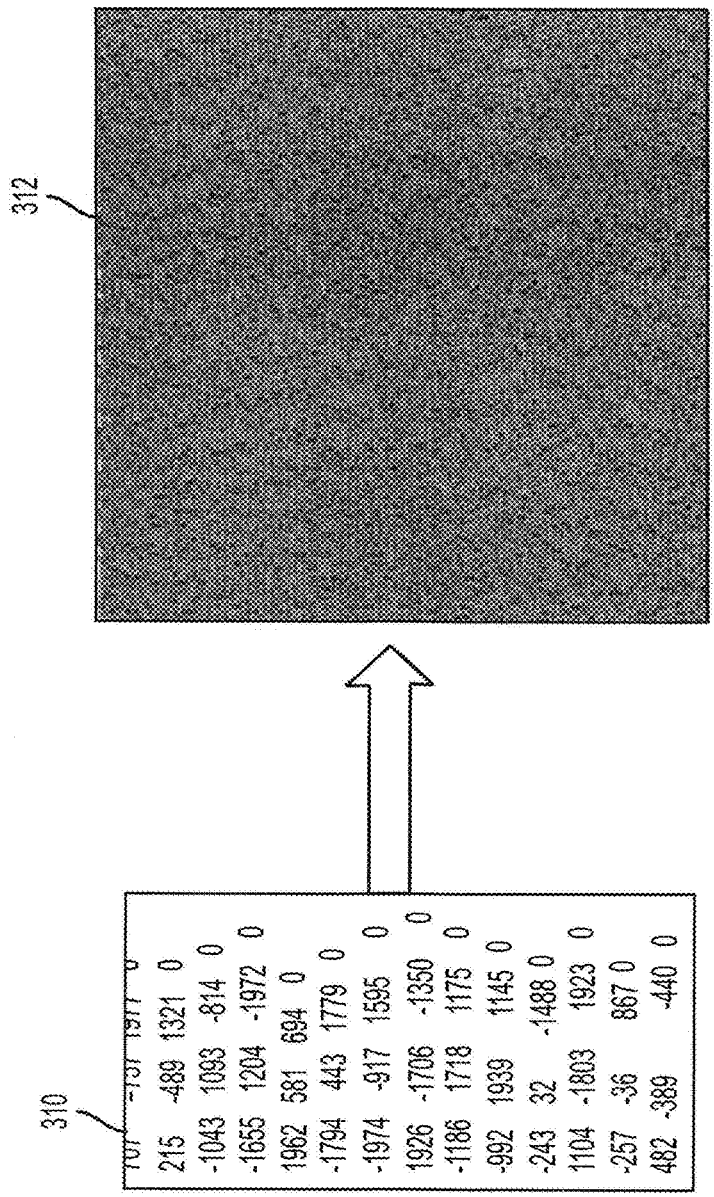
Figure 3D:
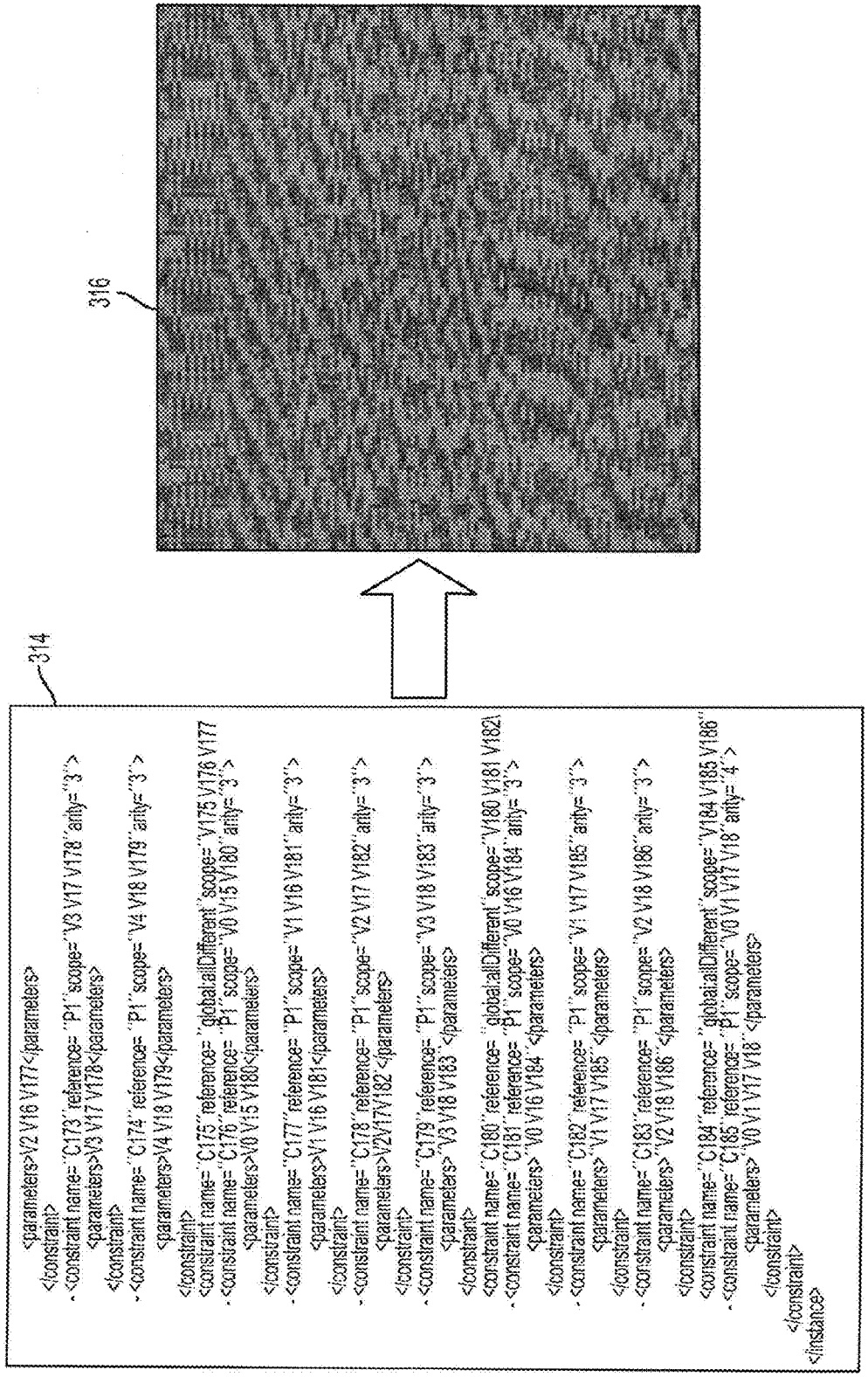
Figure 3E:
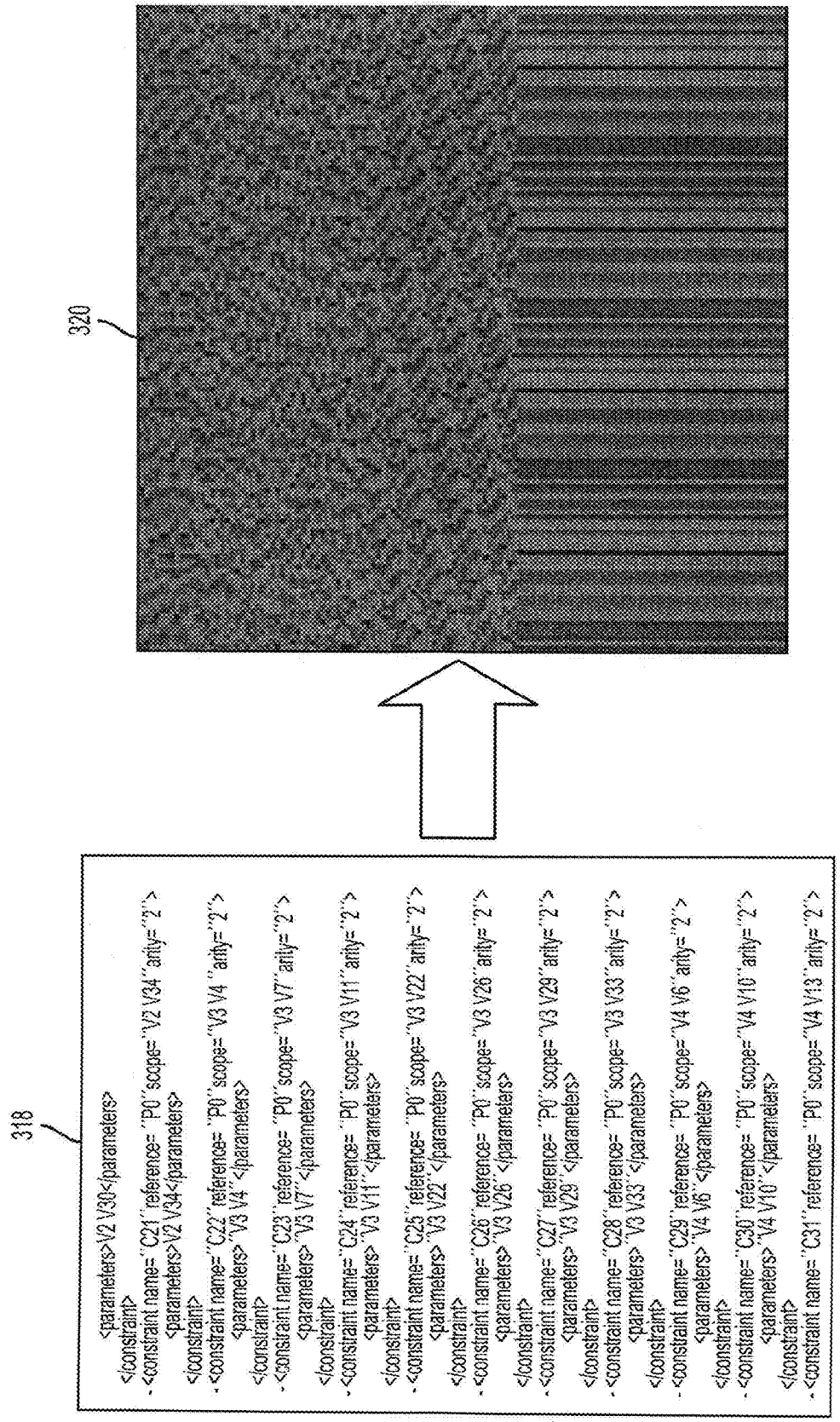

FIGS. 3A, 3B, 3C, 3D and 3E show example problem instances converted to images. FIG. 3A shows an image 304 extracted (converted) from an example SAT problem instance that is represented in a vector of ASCII code 302. Similarly, FIG. 3B shows an image 308 extracted (converted) from another example SAT problem instance that is represented in a vector of ASCII code 306. FIG. 3C shows an image 312 extracted (converted) from yet another example SAT problem instance that is represented in a vector of ASCII code 306. FIG. 3D shows an image 316 extracted (converted) from a CSP instance that is represented in a vector of ASCII code 314. FIG. 3E shows an image 320 extracted (converted) from a CSP instance that is represented in a vector of ASCII code 318. Patterns are visible in each image 304, 308, 312, 316, 320 in those figures.

In machine learning, a neural network is a structure which may be used for classification or regression tasks when the high dimensionality and non-linearity of the data make these tasks hard to accomplish. In the realm of visual data, convolutional neural networks (CNN) is employed. CNNs relates to the hierarchy of the cells in visual neuroscience and its structure roughly resembles the one in the visual cortex. CNNs may be used in image classification area and others such as speech recognition and face recognition.

Convolutional neural networks are designed to deal with multi-dimensions input such as images.

The modular approach of the deep network and the use of convolutional layers allow the early stage of the network to search for junctions of features while the use of pooling layers try to merge them semantically. An embodiment of the present disclosure utilizes convolutional neural networks in the context of algorithm portfolios: an image representation of textual information leverages the capabilities of CNNs to perform algorithm selection in one embodiment of the present disclosure.

Figure 4:
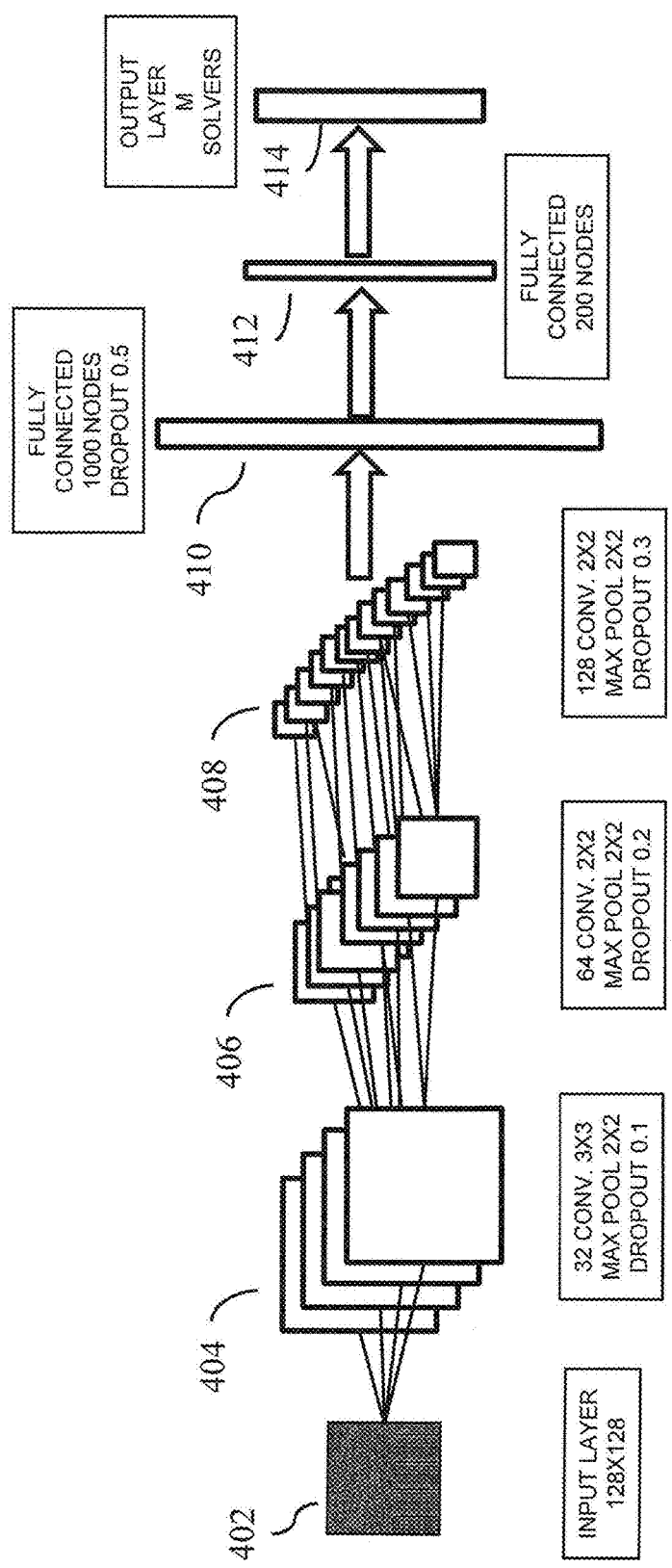
FIG. 4 illustrates a CNN model employed with an image representation of textual information for performing algorithm selection in one embodiment of the present disclosure.

The following describes the employed CNN model in one embodiment of the present disclosure. FIG. 4 illustrates a structure of a CNN model employed with an image representation of textual information for performing algorithm selection in one embodiment of the present disclosure. An example deep CNN network of the present disclosure in one embodiment starts with three convolutional layers 404, 406, 408, each one followed by a max-pool layer and a dropout layer. At the very end of the network there are two fully connected layers 410, 412 with a single dropout layer in the middle. The output layer 414 is composed of m nodes, where m is the number of solvers. Dropout layers help to prevent over fitting and make the neural network performances more stable in combination with other techniques, such as adjusting momentum and learning rate during the training phase. Input layer 402 receives an image that represents extracted features of a problem instance (e.g., rescaled gray scale image).

In one embodiment, the network uses the stochastic gradient descent (SGD) algorithm to speed-up the back-propagation and during the training phase it is updated using Nesterov momentum. In this example, the minibatch size is set to 128, learning rate is initially set to 0.03 and momentum is initially set to 0.9. Both are adjusted during the training phase with step size of 0.003 for learning rate and 0.001 for momentum. The non-linearity used is the rectify function $\phi(x)=\max(0, x)$, while the output layer uses the sigmoid function $\phi(x)=1/(1+e^{-x})$.

FIG. 4 also shows the number of filters used and their dimensions as well as the dimension for each convolutional layers and the probabilities used by the dropout layers and max-pool layers. Before training the neural network, the data is preprocessed in the following way in one embodiment: For each feature, the methodology of the present disclosure subtracts the mean and normalizes each feature to have a standard deviation equal to 1. This preprocessing step is beneficial for efficiency and performances of neural networks. In one embodiment of the present disclosure, the methodology of the present disclosure trains the neural network to predict whether a solver can solve the given instance or not, for example, as a binary regression task. The objective loss function is the binary cross entropy:

$$L=-t \log(p)-(1-t)\log(1-p)$$

where $t \in \{0,1\}$ is the ground truth value, and $p \in [0, 1]$ is the predicted value. In another aspect, the plain classification task, i.e., training the neural network to predict which is the best solver to use for a given instance, may be performed.

The methodology of the present disclosure in one embodiment is oblivious to any domain specific properties, for example, since it is parsing problem instances character by character and does not rely on any given predefined structure. In general, the process exhibits very little bias—except for the step that scales the initial image to its miniature sized version. The scaling function (e.g., the default image scaling algorithm) employed in the methodology of the present disclosure in one embodiment retains the structure that is needed to perform algorithm selection. In one embodiment, this reduction function may be learned (e.g., by a machine) so that the needed structure is retained without depending on an arbitrary transformation. For instance, the methodology may employ, for example, a Long short-term memory (LSTM) network technique to learn the appropriate transformation function.

The neural network, for example, may be implemented on a hardware processor, for example, using computer programming language such as Python 2.7 and Lasagne 0.1. Lasagne is a framework based on Theano 0.7 which allows development of CNNs at an abstract and transparent level. In addition the framework allows exploitation of high performance graphical processing units (GPUs). Lasagne composes the neural network using different available layers stacking them on top of each other. For each layer it is possible to alter various parameters based on the layer's type. This leads to the implementation of the deep neural network.

As an example, training of the neural network may use a number of epochs, for example, 100 or more epochs. The predefined image size to which the images are scaled may be configurable (e.g., 32×32, 128×128, 256×256, or another). For domains with the highest number of instances (e.g., random) larger images may provide better performances, while image size such as 128×128 may provide a trade-off between number of input parameters and performance.

Figure 5:
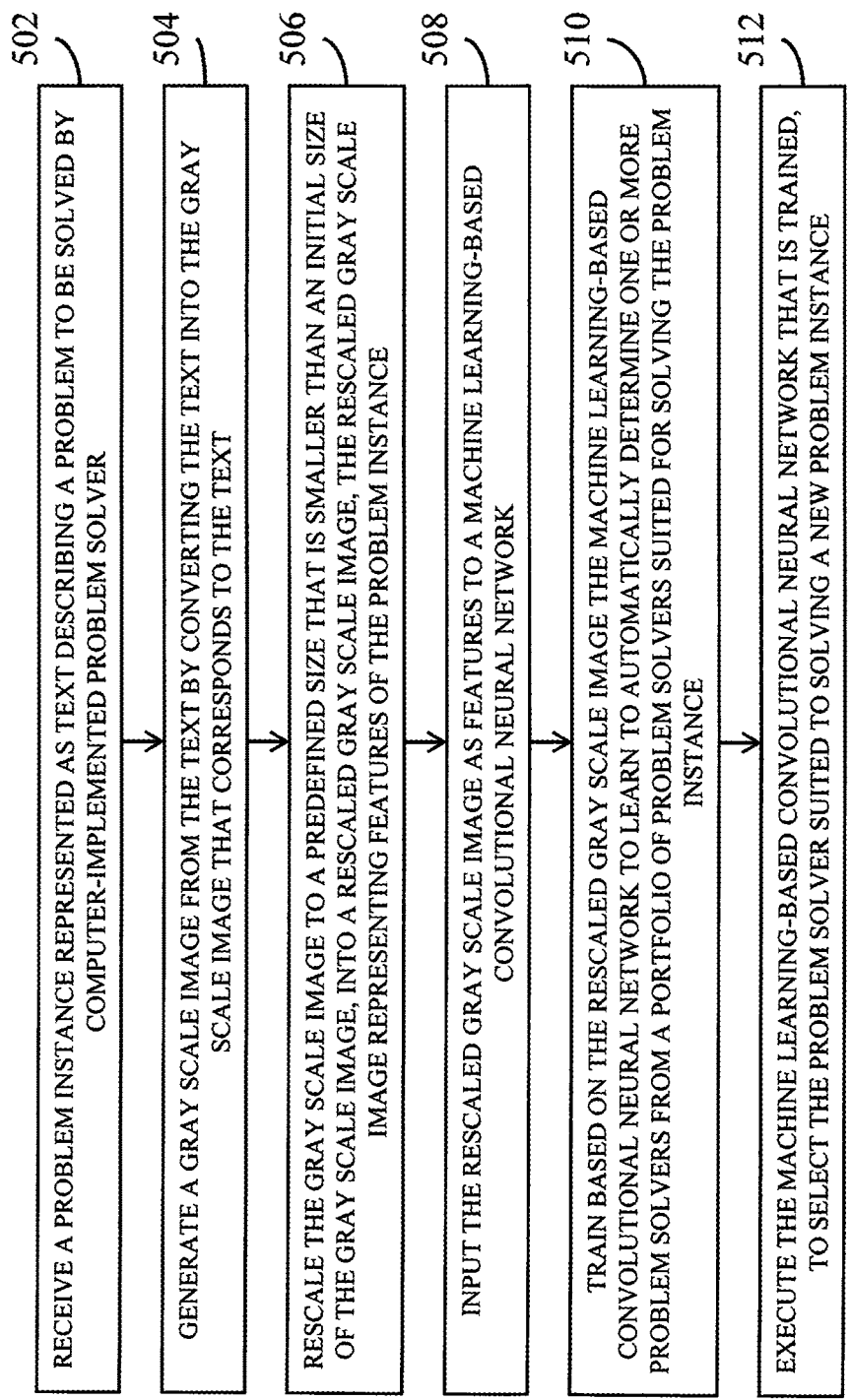
FIG. 5 is a flow diagram illustrating a method of the present disclosure in one embodiment.

FIG. 5 is a flow diagram illustrating a method of the present disclosure in one embodiment, for example, also described with reference to FIG. 1. The method automates feature construction for algorithm portfolios in machine learning. The method in one embodiment is performed or executed by one or more hardware processors. At 502, a problem instance is received, which is represented as text describing a problem to be solved by computer-implemented problem solver. At 504, a gray scale image is generated from the text by converting the text into the gray scale image that corresponds to the text. At 506, the gray scale image is rescaled to a predefined size that is smaller than an initial size of the gray scale image. For sake of description, the gray scale image that is rescaled is referred to as a rescaled gray scale image. The rescaled gray scale image represents features of the problem instance. Automatic feature extraction hence is effected by image generation and scaling. At 508, the rescaled gray scale image is input as features to a machine learning-based convolutional neural network. At 510, based on the rescaled gray scale image, the machine learning-based convolutional neural network is trained to learn to automatically determine one or more problem solvers from a portfolio of problem solvers suited for solving the problem instance. The receiving, generating, rescaling and inputting are performed for a plurality of problem instances, for example, wherein the plurality of corresponding rescaled images are used as a dataset for the training.

At 512, the machine learning-based convolutional neural network that is trained may be executed to select the problem solver suited to solving a new problem instance. The processing at 512 describes a test phase of the neural network. For instance, once the machine learning-based convolutional neural network is trained at 510, it may be tested with a new problem instance. Similarly to steps 502, 504 and 506, the new problem instance may be converted to an image. The converted image is input to the machine learning-based convolutional neural network, for the neural network to output its prediction.

Figure 6:
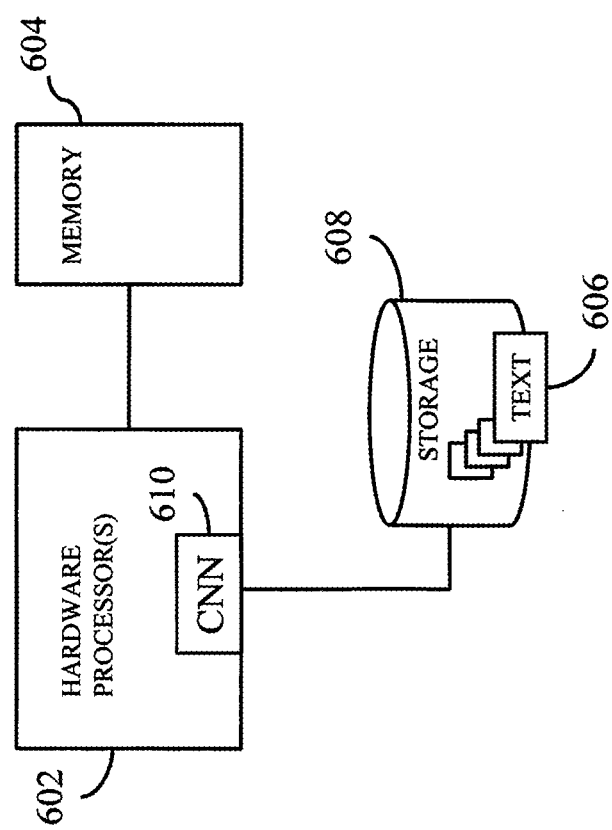
FIG. 6 is a diagram showing components of a system in one embodiment of the present disclosure.

FIG. 6 is a diagram showing components of a system in one embodiment of the present disclosure. One or more hardware processors 602 may be operatively coupled to one or more memory devices 604. One or more of the hardware processors 602 may receive a problem instance represented as text 606 describing a problem to be solved by computer-implemented problem solver. The text 606, for example, may be stored in and retrieved from a storage device 608. The storage device may be coupled or connected to one or more of the hardware processors via a computer network or a communication network, or directly as a local storage device. One or more of the hardware processors may generate a gray scale image from the text by converting the text into the gray scale image that corresponds to the text. The gray scale image may be stored on a memory device 604 and/or the storage device 608. One or more of the hardware processors may rescale the gray scale image to a predefined size that is smaller than an initial size of the gray scale image, into a rescaled gray scale image, the rescaled gray scale image representing features of the problem instance. The rescaled gray scale image may be stored on the memory device 604 and/or the storage device 608. One or more of the hardware processors 602 may train, based on the rescaled gray scale image as features, a machine learning-based convolutional neural network 610 to learn to automatically determine one or more problem solvers from a portfolio of problem solvers suited for solving the problem instance. For generating a dataset for inputting to the machine learning-based convolutional neural network 610 for its training or learning phase, one or more of the hardware processors receives multiple problem instances, generates multiple gray scale images and rescales to multiple rescaled gray scale images respectively. In one aspect, the multiple problem instances are of different problem domains. For instance, one of the multiple problem instance may be of a different domain from another one of the multiple problem instance. In a test phase, one or more of the hardware processors 602 may execute the machine learning-based convolutional neural network 610 that is trained, to select the problem solver suited to solving a new problem instance.

As experimental runs, the methodology of the present disclosure is empirically evaluated using different data sets, e.g., from the Satisfiability (SAT) and constraint programming domains (CSP). The SAT datasets are usually divided into the following three sub-domains: industrial, random and crafted. The experiment includes the performances of 29 solvers for each of about 800 instances for industrial, more than 2,200 instances of random and about 730 of crafted. The experiment also uses the performances of 22 solvers for each of the almost 1,500 instances in the CSP domain. The CSP instances include non-trivial instances from problem classes such as Timetabling, Frequency Assignment, Job-Shop, Open-Shop, Quasi-group, Costas Array, Golomb Ruler, Latin Square, All Interval Series, Balanced Incomplete Block Design, and many others. This set includes both small and large parity constraints and all of the global constraints used during the CSP solver runs: all-different, element, weighted sum, and cumulative.

For each dataset the experiment performed the prediction task using a 10-fold cross validation approach. Hence, the experiment first splits a dataset into a training and test set. The train set is then split further into train and validation splits using a ratio of 75%=25%. The neural network is trained using the images corresponding to the instances of a given dataset. The trained neural network is then used to predict which solver could finish a given test instance within the time limit. The neural network outputs for each solver a value between 0 and 1, where 0 indicates that the solver cannot finish the given instance and 1 means the opposite. For evaluation, the experiment selects the solver whose output obtains the highest value. This strategy in the present disclosure is referred to as CNN. In another aspect, instead of relying solely on the neural network to make the correct decision on which solver to use, it is also possible to interpret the output layer as a new feature vector. A specialized approach for algorithm selection can then be used to try to refine the selection process. This approach in the present disclosure is referred to as "New Feat".

The results obtained by the methods of the present disclosure in the above-described experiments are compared with the ones obtained using regular manually crafted features with CSHC, which represents a state-of-the-art approach in the area of algorithm portfolios. In one embodiment, the methodology of the present disclosure implements a classifier to use. Similar to a majority class in a plain classification task the baseline in this setting is the following: after executing all solvers on the train dataset and computing the average running time elapsed by each one, the experiment chooses as prediction the algorithm that behaves on average the best. This selection strategy in the present disclosure is labeled or referred to as the Best Single Solver (BSS).

The empirical results show that the methodology of the present disclosure provides better performances than the baseline on all considered domains. The methodology of the present disclosure in one embodiment is performed without relying on features crafted by expert humans. The performance may be boosted further if more problem instances would be available for training.

Using the experiment results, it is also considered how the methodology of the present disclosure in one embodiment performs in terms of average run time per instance. For instance, the prediction is compared from the neural network not only in terms of number of solved instances but also in terms of average runtime used by the prediction to solve the instance. The results show that the methodology of the present disclosure in one embodiment is performing better then the BSS in all of the scenarios and the gap to the state-of-the-art is within reasonable limits for a fully automated approach.

With the experimental results, the number of misclassifications that the neural network may incur. e.g., on SAT instances may be assessed. For instance, the last layer of the neural network of the present disclosure in one embodiment is a vector of values in [0, 1], where 0 in position i means that the i-th solver cannot solve the given instance, 1 otherwise. For any test instance and for any solver, the actual ability of the solver (e.g., solve or not solve) is known. Given a test instance, how many output values of the neural network are wrong can be counted by changing to 0 all the values less than equal to 0.5 and changing to 1 the others, comparing the outcomes with reality. The comparison shows that the neural network makes very few errors. As long as the CNN (neural network of the present disclosure in one embodiment) selects a solver that can solve the instance the resulting portfolio will yield good performance. In addition existing algorithm selection techniques can further learn patterns on top of the predictions made by the neural network of the present disclosure to automatically correct mistakes and improve overall predictions.

The results show that the methodology of the present disclosure in one embodiment that converts textual representations of problem instances into gray scale images captures structure of the underlying instance. This structure can then be picked up and exploited with the right tools. The results show that human expertise in feature generation or extraction can be removed from algorithm selection, allowing the tools to be readily applied to new fields.

Algorithm selection is changing the practice of research of algorithms. Instead of creating methodologies that work for all, focus may be placed on highly specialized techniques, selecting the best strategy for the problem at hand. However, in order to get selection techniques to work to their full potential a substantial amount of human expertise is required to create the features necessary to differentiate between instances. In the present disclosure, a methodology is disclosed that fully automates this process, which for example, may make algorithm selection an easier tool for researchers to use off-the shelf. In one embodiment, deep learning techniques is used in automated algorithm portfolios by training a neural network using images extracted from problem instances. This approach provides solid performances on different domains, even without using any domain knowledge. Avoiding feature generation and the usage of domain knowledge makes this new approach useful on a variety of different domains. The methodology of the present disclosure may out-perform any single solver.

In another aspect, the methodology in one embodiment may further introduce domain knowledge to filter out repetitive irrelevant words. Yet in another aspect, another way of encoding words rather than character by character may be possible. Still yet in another aspect, the methodology of the present disclosure may include learning how to compress the initial image in order to retain the necessary structure, for instance, to improve performance further, and also to remove the bias induced, if any, by the employed scaling function. Still yet, the methodology may leverage existing knowledge representations such as the one available from ImageNet (image database) to improve performance. Further yet, manually crafted and automatically generated features may be used for training the neural network, for example, by append the original and new features and using the composed feature vector to train the neural network.

Figure 7:
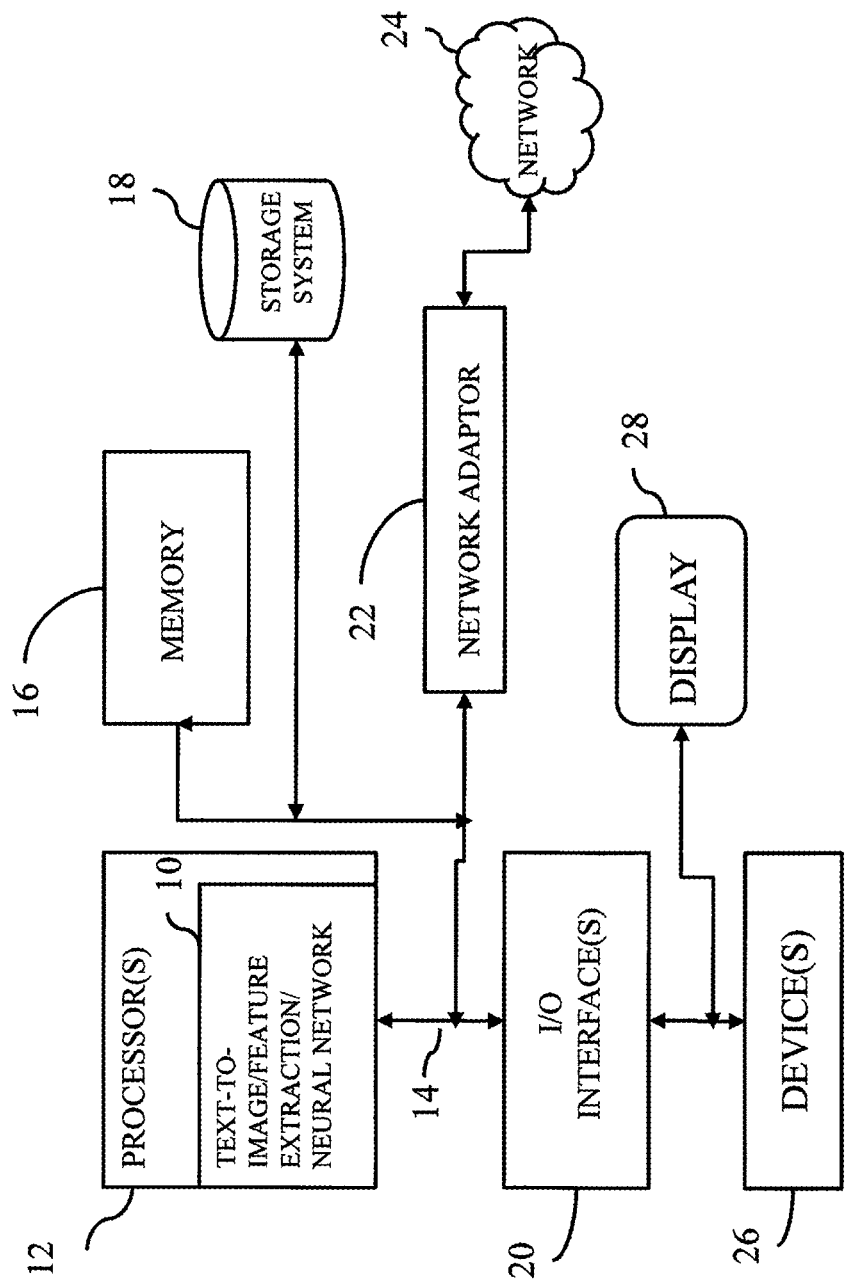
FIG. 7 illustrates a schematic of an example computer or processing system that may implement an automated feature extraction and neural network machine learning in one embodiment of the present disclosure.

FIG. 7 illustrates a schematic of an example computer or processing system that may implement an automated feature extraction and neural network machine learning in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include module(s) 10 that performs the methods described herein. The module(s) 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of automated feature construction for algorithm portfolios in machine learning, comprising:
    receiving, by one or more processors, a problem instance represented as text describing a problem to be solved by computer-implemented problem solver;
    generating, by one or more of the processors, a gray scale image from the text by converting the text into the gray scale image that corresponds to the text;
    rescaling, by one or more of the processors, the gray scale image to a predefined size that is smaller than an initial size of the gray scale image, into a rescaled gray scale image, the rescaled gray scale image representing features of the problem instance;
    inputting, by one or more of the processors, the rescaled gray scale image as features to a machine learning-based convolutional neural network; and
    training based on the rescaled gray scale image, by one or more of the processors, the machine learning-based convolutional neural network to learn to automatically determine one or more problem solvers from a portfolio of problem solvers suited for solving the problem instance,
    wherein the receiving, generating, rescaling and inputting are performed for a plurality of problem instances for the training.

2. The method of claim 1, further comprising:
    executing, by one or more of the processors, the machine learning-based convolutional neural network that is trained, to select the problem solver suited to solving a new problem instance.

3. The method of claim 1, wherein the generating comprises replacing each character in the text by a corresponding ASCII code and storing the corresponding ASCII code in a vector of length N, N representing character length of the text.

4. The method of claim 3, wherein the rescaling comprises reshaping the vector into a new dimension comprising a square root of N.

5. The method of claim 1, wherein the rescaling comprises reshaping the gray scale image to a square gray scale image.

6. The method of claim 5, wherein the predefined size is 128×128 pixels.

7. The method of claim 1, wherein the machine learning-based convolutional neural network outputs for a solver a value between 0 and 1, wherein 0 indicates that the solver cannot finish solving the problem instance in a given timeframe and 1 represents that the solver can finish solving the problem instance in the given timeframe.

8. The method of claim 1, wherein an output of the machine learning-based convolutional neural network is input to an algorithm selection tool as a feature vector.

9. A system of automated feature construction for algorithm portfolios in machine learning, comprising:
    one or more memory devices;
    one or more hardware processors operatively coupled to the memory device,
    one or more of the hardware processors operable to receive a problem instance represented as text describing a problem to be solved by computer-implemented problem solver,
    one or more of the hardware processors further operable to generate a gray scale image from the text by converting the text into the gray scale image that corresponds to the text,
    one or more of the hardware processors further operable to rescale the gray scale image to a predefined size that is smaller than an initial size of the gray scale image, into a rescaled gray scale image, the rescaled gray scale image representing features of the problem instance,
    one or more of the hardware processors operable to train based on the rescaled gray scale image as features, a machine learning-based convolutional neural network to learn to automatically determine one or more problem solvers from a portfolio of problem solvers suited for solving the problem instance,
    wherein the one or more of the hardware processors receives multiple problem instances, generates multiple gray scale images and rescales to multiple rescaled gray scale images respectively, the multiple rescaled gray scale images used as a training dataset for training the machine learning-based convolutional neural network.

10. The system of claim 9, wherein the multiple problem instances are of different problem domains.

11. The system of claim 9, wherein one or more of the hardware processors executes the machine learning-based convolutional neural network that is trained, to select the problem solver suited to solving a new problem instance.

12. The system of claim 9, wherein one or more of the hardware processors generates the gray scale image by replacing each character in the text by a corresponding ASCII code and storing the corresponding ASCII code in a vector of length N on the memory device, N representing character length of the text.

13. The system of claim 12, wherein one or more of the hardware processors rescales by reshaping the vector into a new dimension comprising a square root of N.

14. The system of claim 9, wherein one or more of the hardware processors rescales by reshaping the gray scale image to a square gray scale image.

15. The system of claim 9, wherein the predefined size is 128×128 pixels.

16. The system of claim 9, wherein the machine learning-based convolutional neural network outputs for a solver a value between 0 and 1, where 0 indicates that the solver cannot finish solving the problem instance in a given timeframe and 1 represents that the solver can finish solving the problem instance in the given timeframe.

17. The system of claim 9, wherein an output of the machine learning-based convolutional neural network is input to an algorithm selection tool as a feature vector.

18. A computer readable storage medium storing a program of instructions executable by a machine to perform a method of automated feature construction for algorithm portfolios in machine learning, the method comprising:

receiving a problem instance represented as text describing a problem to be solved by computer-implemented problem solver;

generating a gray scale image from the text by converting the text into the gray scale image that corresponds to the text;

rescaling the gray scale image to a predefined size that is smaller than an initial size of the gray scale image, into a rescaled gray scale image, the rescaled gray scale image representing features of the problem instance;

inputting the rescaled gray scale image as features to a machine learning-based convolutional neural network; and training based on the rescaled gray scale image the machine learning-based convolutional neural network to learn to automatically determine one or more problem solvers from a portfolio of problem solvers suited for solving the problem instance, wherein the receiving, generating, rescaling and inputting are performed for a plurality of problem instances for the training.

19. The computer readable storage medium of claim 18, further comprising: executing the machine learning-based convolutional neural network that is trained, to select the problem solver suited to solving a new problem instance.

20. The computer readable storage medium of claim 18, wherein the generating comprises replacing each character in the text by a corresponding ASCII code and storing the corresponding ASCII code in a vector of length N, N representing character length of the text and the rescaling comprises reshaping the vector into a new dimension comprising a square root of N.

\* \* \* \* \*